(No Model.)
W. P. MILLER.
LUBRICATOR.
No. 531,129. Patented Dec. 18, 1894.
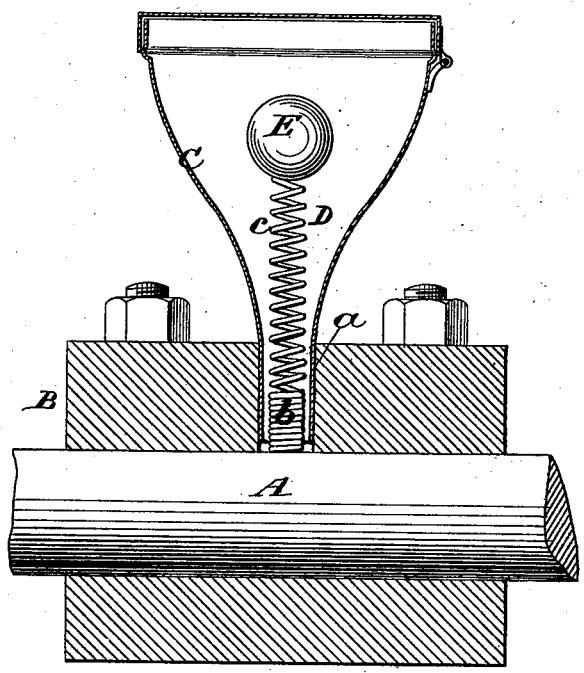
Witnesses:—
George Barry,
C. L. Sundgren
Inventor-
William P. Miller
by attorneys
Brown & Seward

UNITED STATES PATENT OFFICE.

WILLIAM P. MILLER, OF BROOKLYN, NEW YORK, ASSIGNOR TO THE WILLIAM P. MILLER COMPANY, OF SAME PLACE.

LUBRICATOR.

SPECIFICATION forming part of Letters Patent No. 531,129, dated December 18, 1894.

Application filed February 6, 1894. Serial No. 499,252. (No model.)

*To all whom it may concern:*

Be it known that I, WILLIAM P. MILLER, of the city of Brooklyn, in the county of Kings and State of New York, have invented a new and useful Improvement in Oil-Cups for Lubrication, of which the following is a specification.

This invention relates to oil cups in which there is employed a grease or lubricating compound which is solid at ordinary temperature. In such oil cups it has been common to use a central pin or spindle arranged loosely within the cup and having one end resting upon the journal or rotating part to be lubricated, such pin or spindle being caused to vibrate by the jar of the journal or journal box and to be rotated by the contact of its end with the journal or rotating part. The pin or spindle is commonly made simply of a straight, solid and practicably inflexible piece of copper or other wire fitted loosely to the tube or that part of the cup which is inserted into the cap of the journal box or other bearing. Instead of this solid and inflexible pin or spindle, I employ a spindle consisting of a coil of wire, the upper part of which is free to vibrate laterally within the cup and has attached to it a weight which assists such vibration.

The accompanying drawing represents a side view of a journal or portion of a shaft and a central section of a journal box and of a lubricator embodying my invention applied to said box.

A is the shaft; B, the journal box, and C the grease cup of the lubricator. This cup may be made of any metal and of any suitable form with a tubular extension $a$ at its bottom which is intended to fit the hole provided for it in the cap of the journal box and which forms the throat of the cup.

D is the spindle of coiled wire of any suitable metal which constitutes my invention, inserted loosely through the tubular extension $a$ of the cup C and extending upward into the body of the cup. The lower part of this spindle which rests upon the shaft or journal is represented as closely coiled as indicated at $b$ in the drawing, so that it practically forms a tube and gives it a good bearing on the shaft or journal, and the part above which is contained within the body of the cup is more openly coiled to give it more flexibility. The upper end of the coil of the spindle is represented as having attached to it a weight E.

The spindle D constructed of coiled wire will be caused to rotate continuously or from time to time by the friction of the shaft or journal on its lower end and at the same time the jar of the journal will, by reason of the natural flexibility and elasticity of the wire, cause the upper openly coiled portion $c$ to vibrate laterally in all directions within the lubricating matter in the cup and so keep the said matter free to follow the coil downward to the journal. This vibration is rendered more active by the weight E at the upper end of the coil.

The close coiling of the lower part of the wire makes it a better conductor to the grease in the cup of the heat generated by the friction of the journal on the bottom of the coil and so better insures the melting of the grease in the throat and lower part of the cup and at the point where it is to be applied.

What I claim as my invention is—

The combination with a grease cup, of a flexible and elastic wire coil the lower part of which is received within the throat of the cup and the upper part of which projects upward into the body of the cup to within some distance from the top thereof, and a weight attached to the upper end of said coil and held at a distance above the throat but otherwise unconfined and free to vibrate laterally in all directions with the upper part of the coil within the body of the cup, substantially as herein described.

WILLIAM P. MILLER.

Witnesses:
FREDK. HAYNES,
GEORGE BARRY.